June 3, 1958 J. M. MARKEL ET AL 2,837,229
TRACTOR MOUNTED LOADER
Filed May 7, 1953 3 Sheets-Sheet 1

INVENTOR.
J M MARKEL
W R SCHMIDT
BY A R ZELLNER
ATTORNEY

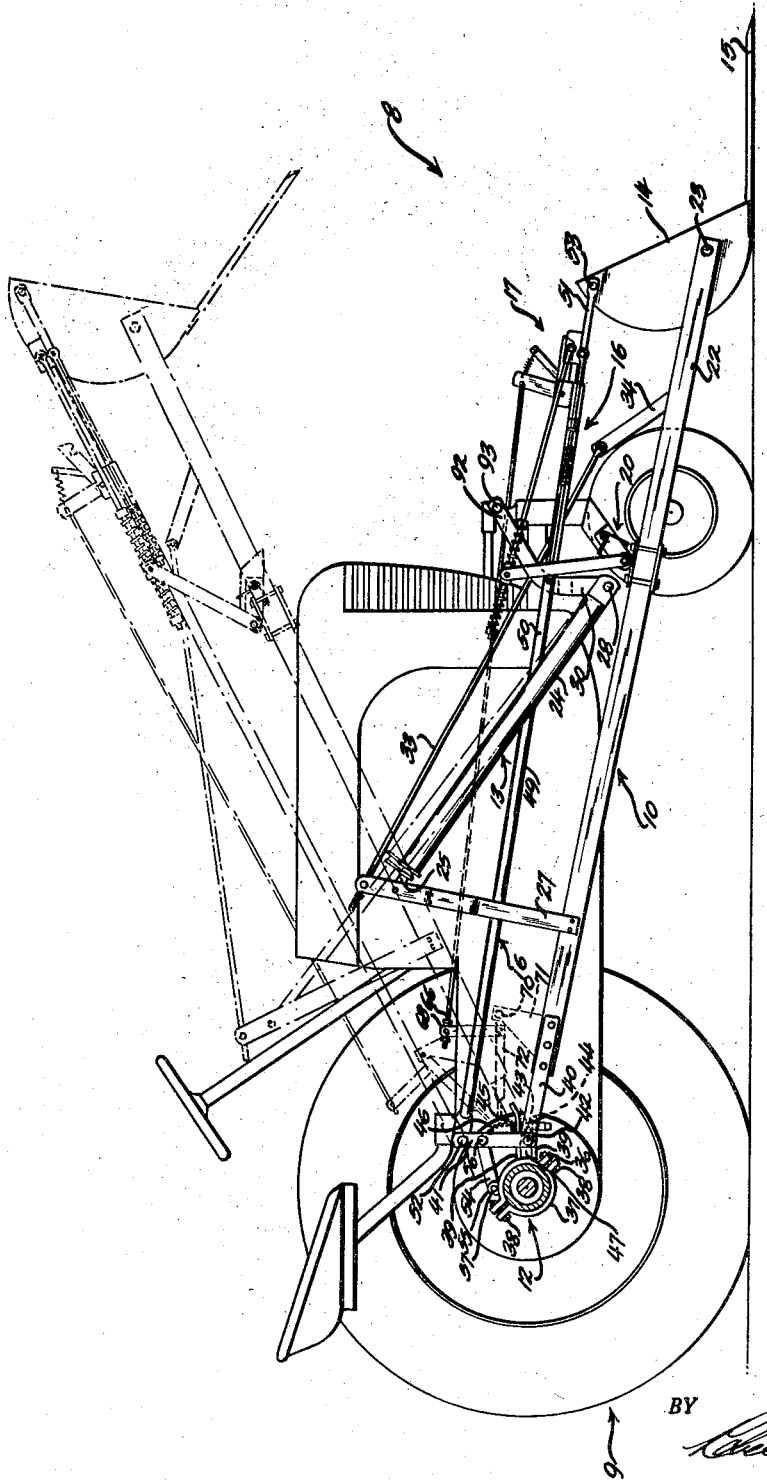

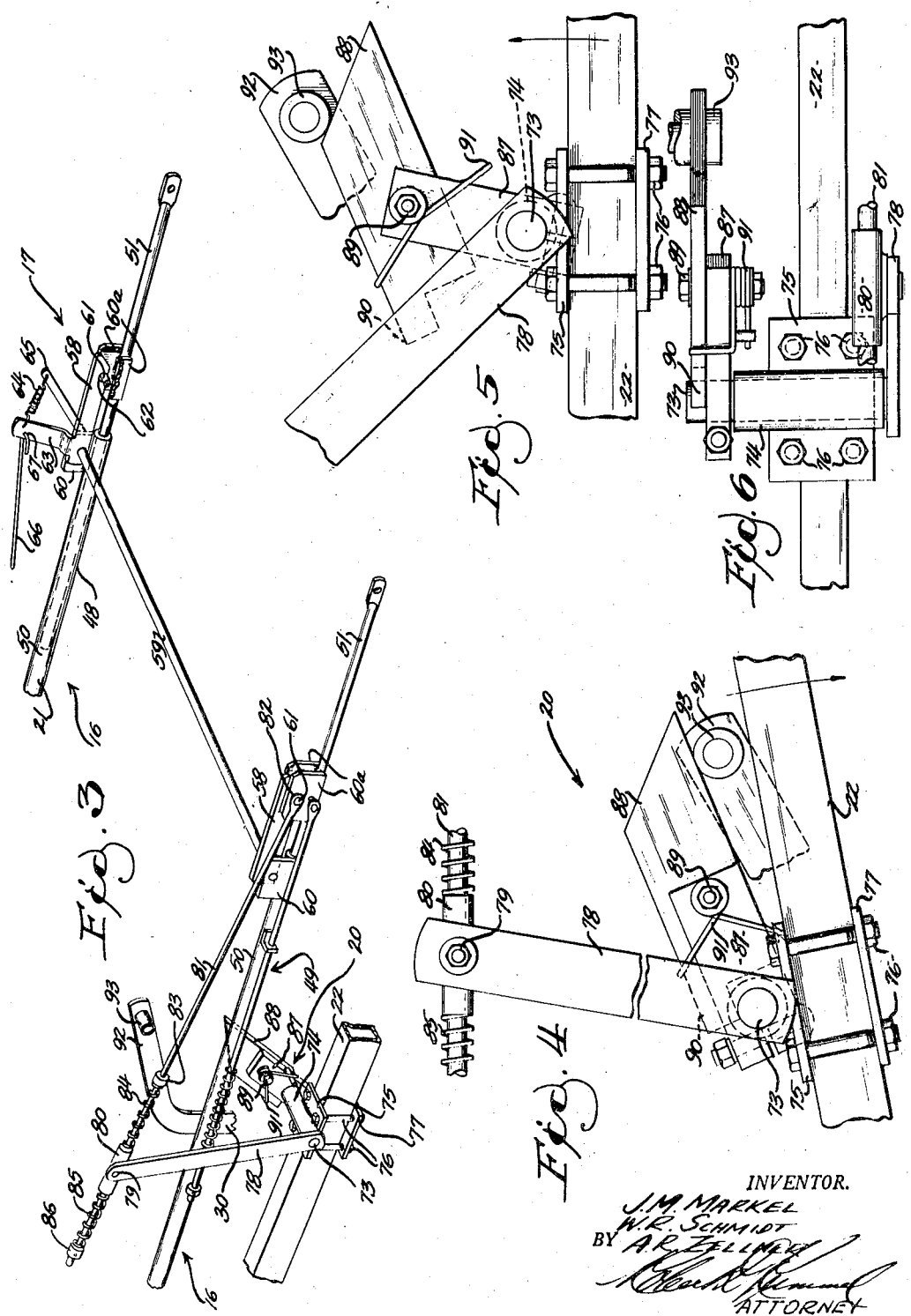

United States Patent Office 2,837,229
Patented June 3, 1958

2,837,229

TRACTOR MOUNTED LOADER

John M. Markel, William R. Schmidt, and August R. Zellmer, Rockford, Ill., assignors to J. I. Case Company, Racine, Wis., a corporation of Wisconsin Application May 7, 1953, Serial No. 353,544

6 Claims. (Cl. 214—140)

The present invention relates to tractor mounted loaders, such as manure loaders, and the primary object of the present invention is to generally improve the operation and construction of mechanisms of this type.

A further object of the present invention is to provide an improved load transmitting means for acting on the bucket for causing the bucket, as it moves from its raised dumping position to its lowered position, to move to its load receiving or carrying position and become latched in this position.

A still further object of the present invention is to provide a linkage system between the bucket and the tractor for swinging the bucket from its lowered position to its raised dumping position and for causing the bucket to tilt forwardly an amount sufficient to prevent the bucket from becoming overbalanced when raised to an extreme height.

Another object of the present invention is to provide a quick detachable connection whereby the loader can be easily connected to or taken off a tractor.

Further objects and advantages of the invention will be apparent from the description and claims.

In the drawings, in which an embodiment of our invention is shown:

Fig. 2 is a right-side elevational view, with parts removed, of the combination shown in Fig. 1.

Fig. 3 is a right-front perspective view, slightly enlarged, of certain structure of the loader and particularly showing the latching mechanism thereof.

Fig. 4 is a right-side elevational view, slightly enlarged, of the force transmitting means shown in Fig. 3, showing the mechanism when the loader is being permitted to swing downwardly into a loading position.

Fig. 5 is a view similar to Fig. 4 showing the mechanism when the loader is being moved into a raised dumping position.

Figure 1:
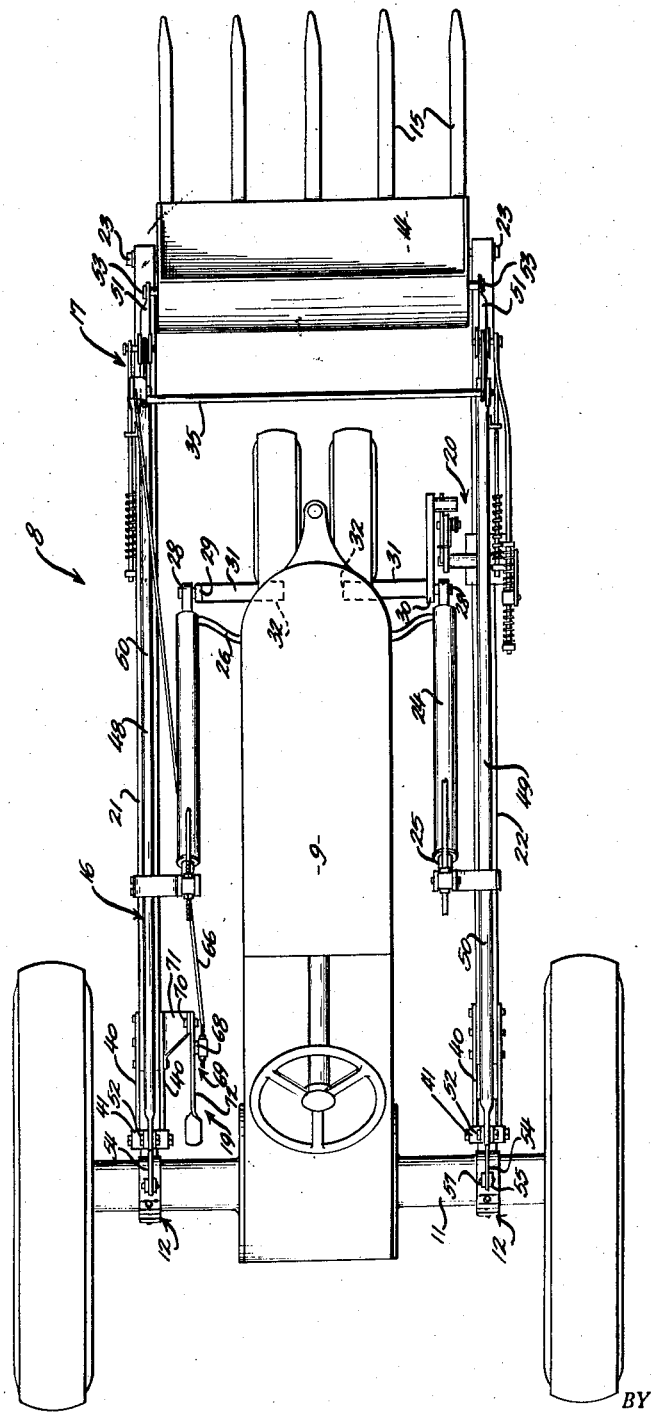
Fig. 1 is a plan view of a loader illustrative of the present invention shown in combination with the tractor.

And Fig. 6 is a plan view of the force transmitting means shown in Fig. 4.

Referring to Figs. 1 and 2 of the drawings, the construction shown comprises a loader, generally designated by the number 8, which may be mounted on a vehicle driven by an engine, which in the present instance, is in the form of a tractor 9 of any suitable or conventional construction, the loader 8 including a fork supporting boom 10 straddling the tractor and detachably and pivotally secured to a rear axle housing 11 of the tractor by means of suitable detachable clamps 12, the boom 10 extending forwardly therefrom. A pair of hydraulic cylinders 13 act upon the boom 10 for swinging the boom from a loading to a dumping position, and a pick-up bucket 14, having a plurality of tines 15 secured to the forward edge thereof and extending forwardly therefrom, is pivotally mounted on the swingable end of the boom 10. An extensible linkage 16 is secured between the pick-up bucket 14 and a point fixed with respect to the detachable clamps 12, and a latch mechanism 17 is carried by the extensible linkage 16 for locking the bucket in its load receiving or carrying position and for effecting or permitting extension of the linkage 16 in response to actuation of a foot lever 19 for permitting the bucket 14 to be biased downwardly by the weight of the load carried therein into an unloading position. A force transmitting means 20 is provided for acting on the bucket 14 so that the bucket is swung from its load dumping position to its load receiving or carrying position when the boom 10 is moved downwardly a predetermined amount.

The supporting boom 10 comprises in the present instance spaced apart forwardly extending arms 21 and 22, one on each side of the tractor 9, each arm being pivotally and detachably connected with the rear axle housing 11 by means of the quick detachable clamps 12 as previously suggested. The bucket 14 is swingably carried between the arms 21 and 22 adjacent the forward ends thereof by means of trunnions 23 which are suitably received in the respective arms so that the bucket is so supported as to be biased to swing into an unloading position when carrying a load of material therein. Hydraulic cylinders 13 are provided as previously suggested for swinging the boom 10 from a loading to an unloading position, and these hydraulic cylinders are preferably of the single action type each comprising a cylindrical housing portion 24 and a piston rod portion 25, piston rod portion 25 being responsive to a fluid pressure delivered into the cylindrical portion 24 from a suitable hydraulic system carried by the tractor, not shown, by way of a conduit 26 so that the piston rod 25 is capable of being moved into an extended position with respect to the cylindrical portion 24, the hydraulic cylinders 13 being extensible in unison and under complete control of the operator in any suitable or well-known manner. The upper end of each of the piston rod portions 25 is pivotally secured to an upwardly extending arm 27, the arms 27 in turn being rigidly secured to the respective arms 21 and 22 of the boom 10. The lower ends of the portions 24 of the cylinders 13 are pivotally mounted at 28 to downwardly depending brackets 29 and 30, the brackets 29 and 30 each being rigidly secured as by welding or the like to a suitable transverse supporting post 31, the supporting posts 31 each being detachably secured in the usual socket 32 of the tractor provided for the attachment of cultivator beams, tool beams, or cross beams. In order to hold the upright members 27 in their proper positions with respect to the arms 21 and 22 of the boom 10, a pair of tension rods 33 is provided connected between rearwardly extending brackets 34 rigidly secured to the respective boom arms and the respective upwardly extending members 27, and adjacent the connection of the brackets 34 to their respective boom arms 21 and 22 is provided a cross bar 35 which is rigidly secured between the boom arms 21 and 22 for providing rigidity to the boom forwardly of the tractor. The clamps 12 are positioned adjacent the opposite ends of the rear axle housing 11, and each of the clamps includes a pair of substantially semi-circular link elements 36 and 37 which are clamped to the rear axle housing by means of suitable bolts or the like 38. Each of the link elements 36 is provided with a pair of forwardly extending receiving prongs 39 which are suitably spaced from one another so as to provide therebetween a suitable horizontally open slot, the prongs 39 being in longitudinal alignment with respect to the respective arms 21 and 22 of the boom 10. Each of the arms 21 and 22 has secured to the opposite sides thereof and adjacent the rearward ends thereof a pair of rearwardly extending bars 40. Pairs of links 41 are swingably secured as by bolts 42 to the sides of the bars 40 of each of the arms 21 and 22 and a spacer 43 is carried by the bolt 42 between the respective bars 40 so as to maintain the bars in their properly spaced-apart position. The prongs 39 have formed therein suitable aligned openings 44 and are adapted to be received in the space formed between the respective bars 40, the spacer 43 being positioned in the space between prongs 39 and rearwardly of the aligned openings 44, and a suitable readily detachable pin 45 carried on a chain 46 is insertable in the aligned openings 44. A suitable stop 47 is provided between the respective prongs 39 rearwardly of the aligned openings 44 for acting as a rearward limit for the spacer 43. It will be appreciated that the pivotal connection between the respective arms 21 and 22 of the boom 10 and the tractor is effected in this instance without the use of bolts or other like fastening means which would require considerably more time to effect the connection.

The apparatus for locking the bucket in load receiving position or for effecting or causing the bucket to swing into an unloading position includes the extensible linkage 16 and the latching mechanism 17 as previously suggested. The extensible linkage 16 consists of a pair of telescopic links 48 and 49, each of these links being identical in construction and each including a receiving member 50 and a slidable member 51. The links 48 and 49 are positioned on opposite sides of the tractor and each of the members 50 is secured rearwardly to one of the links 41 adjacent the upper end thereof as by a suitable readily detachable bolt or the like 52. Each of the slidable members 51 suitably receives adjacent its forward end a trunnion 53 of the bucket 14. Each pair of links 41 is held in a substantially upright position by means of a connecting link 54 which is secured by means of bolts 56 and 57 between the respective links 41 and suitable lugs 55 formed on the respective link member 36. It will be appreciated that upon unlatching of the respective links 48 and 49 the bucket 14 is free to swing downwardly into an unloading position about the axis of trunnions 23.

The latch mechanism 17, see Fig. 3, is carried by the respective links 48 and 49 and is so formed as to permit extension of the links 48 and 49 when in an unlatched condition so as to permit the bucket 14 to swing into an unloading position, and to lock the links 48 and 49 in a telescoped nonextensible position when in a latched condition for locking the bucket 14 in its load receiving position. The latch mechanism includes in the present instance a pair of forwardly extending pin receiving arms 58 which are secured to opposite ends of a cross shaft 59 rotatably carried in suitable plates 60 fixed to the respective members 50 adjacent the forward ends thereof. The members 51 of the links 48 and 49 each carry a pair of suitable latch pin supporting plates 60a which have a latch pin 61 secured therebetween, and the plates 60a are so spaced as to receive therebetween one of the pin receiving arms 58, each of the arms 58 being suitably notched as at 62 for receiving therein the respective pins 61. The cross shaft 59 adjacent link 48 has fixed thereto an upwardly extending rock arm 63, and the cross shaft 59 is biased to swing in a latching direction by means of a tension spring 64 which is secured between rock arm 63 and a suitable standard 65 extending forwardly from the plate 60 adjacent the rock arm 63. It will be appreciated therefore that the respective arms 48 and 49, when the arms 58 are engaging the pins 61 of the plates 60a, are rigid and nonextensible, and that the plates 60a of the latching mechanism 17 are so positioned on the members 51 of the links 48 and 49 that when the links 48 and 49 are in a nonextensible latched condition, the bucket 14 is in its load receiving position. The latch 17 is under the control of the operator from his position on the tractor so that when the boom 10 is raised into an unloading position, the operator can cause or permit the bucket 14 to move into an unloading position when it is so desired. This mechanism 19 includes a rearwardly extending link 66 connected adjacent its forward end to the rock arm 63 as at 67 and rearwardly to a leg 68 of a bell crank 69. The bell crank 69 is pivotally secured as at 70 to a plate 71, the plate in turn being rigidly secured to the arm 21 of boom 10 so as to extend upwardly therefrom. The other leg of the bell crank 69 is in the form of a foot pedal 72 which extends rearwardly from the plate 71.

The operator by depressing the foot pedal 72 can rock the rock shaft 59 in an unlatching direction against the force exerted by spring 64 which in turn rocks the arms 58 sufficiently in an unlatching direction to release the pins 61. When the pins 61 are released by the arms 58, the links 48 and 49 are extensible sufficiently to permit the bucket 14 to swing downwardly into its unloading position about the axis of trunnions 23, as shown in dotted lines in Fig. 2.

It will be appreciated that when the bucket 14 is moved from a loading position, as viewed in Fig. 2, full lines, to a raised or unloading position, that the bucket will assume a lesser angle with respect to the horizontal than the boom 10, the purpose being to keep the loaded bucket from getting overbalanced, or tilting too far toward the tractor when raised to an extreme height, while still being supported at a sufficient angle for keeping the load from falling off the front end of the bucket. It will be appreciated that the distance between the trunnions 53 and the trunnions 23 is greater than the distance between the pivotal connections 52 and 42. Also it will be apparent that the distance between trunnions 53 and pivotal connections 52, when linkage 16 is retracted, is less than the distance between trunnions 23 and pivotal connections 42. Therefore, when the bucket rests on the ground and the tines 15 are sufficiently parallel with the ground, the trunnions 53 will move forwardly in relationship to the trunnions 23 and pivotal connections 42 and 52 when the boom 10 is raised to its maximum upwardly inclined position, the bucket 14 consequently being tilted forwardly about the axis of trunnions 23 relatively to boom 10 sufficiently to position the bucket 14 at a lesser angle with respect to the ground than the boom 10, but not sufficiently to maintain the bucket with the tines parallel to the ground.

As previously suggested, a force transmitting means 20 is provided for acting on the bucket 14 so as to move the bucket from its dumping position to its load receiving or carrying position when the boom 10 is moved downwardly a predetermined distance. This mechanism consists of a rock shaft 73 rotatably carried in a suitable bearing 74, the bearing 74 being carried by a plate 75 which in turn is secured to the boom arm 22 by means of suitable straddle bolts 76 and a plate 77, see Figs. 4, 5, and 6. The rock shaft 73 has fixed adjacent one end thereof a reset arm 78 and the reset arm 78 pivotally carries adjacent the upper end thereof as by a bolt or the like 79 a sleeve portion 80. The sleeve portion 80 slidably receives therein a reset rod 81 which is connected adjacent its forward end in the present instance to one of the pins 61 as at 82, see Fig. 3. A thrust collar 83 is provided on the reset rod 81 forwardly of the sleeve 80 and a spring 84 is received by the reset rod between the sleeve 80 and the collar 83. A spring 85 is received by the rod 81 rearwardly of the sleeve 80 and is confined rearwardly on the rod 81 by means of a suitable thrust collar 86. Adjacent the other end of the rock shaft 73 is fixed a rock arm 87 which is angled with respect to the arm 78, and a cam follower 88 is pivoted to the arm 87 as by a bolt or the like 89. The cam follower 88 has formed adjacent the rearward end thereof a suitable abutment portion 90 which is so positioned as to abut the rock shaft 73 when the cam follower 88 is pivoted rearwardly in a counterclockwise direction about the axis of the bolt 89 a predetermined amount. Further pivotal movement of the cam follower 88 will carry the rock arm 87 in the same direction a like distance so as to rock the rock shaft 73 and consequently the rock arm 78 in the same direction. A torsion spring 91 is carried by the bolt 89 and is so connected between the rock arm 87 and the cam follower 88 as to bias the follower to pivot rearwardly into abutting engagement with the rock shaft 73. The bracket 30 has a forwardly and upwardly extending portion 92 which carries adjacent its forward end a suitable roller 93, and the roller 93 is so positioned as to be in the path of travel of that portion of cam follower 88 extending longitudinally beyond the end of rock arm 87 when the boom 10 is moved from a raised to a lowered position. More specifically, when the boom 10 is moved from a raised to a lowered position, and the bucket 14 is in an unloading position with the links 48 and 49 extended, the cam follower 88 upon being lowered sufficiently to come into contact with the roller 93 will be rocked or pivoted rearwardly or in a counter-clockwise direction. Upon continued movement of the boom downwardly, see Fig. 4, this rearward pivotal movement of the cam follower 88 will rock the rock shaft 73 in the same direction due to the abutment of the portion 90 with the rock shaft. Upon further movement of the boom 10 downwardly, the cam follower 88 will be rocked rearwardly sufficiently to swing the reset arm 78 rearwardly enough to effect sufficient rearward movement of the reset rod to move the bucket 14 into its load receiving position, the forward edges of the arms 58 of the latch mechanism 17 being inclined so as to automatically engage the pins 61 and lock the bucket 14 in its load receiving position. The mechanism is so formed that the cam follower 88 does not come into contact with the fixed roller 93 until the tines 15 are approximately two feet from the ground so that the bucket can be used in its dumping position as a leveling tool. After the bucket 14 has been moved into a load receiving or carrying position, the boom 10 can once again be moved into a raised position, and the cam follower 88 by engagement with the roller 93 will be rocked forwardly or in a clockwise direction about the axis of the bolt 89 when the boom 10 is moved upwardly, see Fig. 5. However, this forward or clockwise pivotal movement of the cam follower 88 about the axis of the bolt 89 has no effect upon the rock shaft 73. It will be appreciated that the cam follower 88 allows the bucket 14 to be tripped or moved into an unloading position in substantially any position of the boom 10 besides protecting the reset rod 81 and it is associated mechanism from being damaged should the bucket 14 become accidentally unlatched at any time when under load. This of course is due to the freely pivotal nature of the cam follower 88 in one direction as previously explained, whereby it is impossible for the weight of the loaded bucket to be imposed on the reset mechanism at any point in the travel of the bucket except in the narrow region in which resetting normally takes place.

It will be appreciated that initial swinging movement of the rock arm 78 rearwardly in response to the rocking of the rock shaft 73 in the same direction by reason of the movement of the cam follower 88 into abutting relationship with respect to the roller 93 when the boom 10 is permitted to move downwardly, acts so as to compress the spring 85 between the collar 86 and the sleeve 80. It will be further appreciated that the springs 84 and 85 function so as to hold the rock shaft 73 in a predetermined position, the cam follower 88 therefore being positioned so as to move into abutting relationship with the roller 93 upon the bomb's being moved downwardly. These springs also function so as to dampen the tendency of the bucket 14 to swing back and forth after the same has been allowed to swing into an unloading position.

What we claim:

1. In a tractor mounted loader having a swingable boom and a bucket swingably carried adjacent the swinging end of said boom, said bucket being biased to move from a load receiving position to a load dumping position, means for latching said bucket in its load receiving position, and means operable by the operator from his position on the tractor for unlatching said bucket for permitting said bucket to swing into its load dumping position, the improvement comprising a force transmitting means for moving the bucket from its load dumping position to its load receiving position upon said boom's being permitted to swing downwardly a predetermined distance comprising a swingable member rotatably carried by said boom and rockable about an axis substantially parallel to the axis of swinging movement of said bucket, said swingable member including a reset arm and an angularly disposed rock arm, a cam follower pivotally secured to said rock arm and freely swingable with respect thereto when rocked in one direction and caused to swing into engaging relationship with said swingable member when rocked in the other direction for rocking said swingable member in said other direction, an abutment fixed with said tractor and in the path of movement of said cam follower upon swinging of said boom downwardly or upwardly relatively to said abutment, said cam follower engaging said swingable member upon said boom's being permitted to move downwardly relatively to said abutment for rocking said swingable member in said other direction in response to said abutment's urging said cam follower in said other direction, and a reset rod between said reset arm and said bucket for swinging said bucket into its load receiving position in response to said cam follower's being rocked in said other direction a predetermined amount.

2. In a tractor mounted loader having a swingable boom and a bucket swingably carried adjacent the swinging end of said boom, said bucket being biased to move from a load receiving position to a load dumping position, means for latching said bucket in its load receiving position, and means operable by the operator from his position on the tractor for unlatching said bucket for permitting said bucket to swing into its load dumping position, the improvement comprising a force transmitting means for moving the bucket from its load dumping position to its load receiving position upon said boom's being permitted to swing downwardly a predetermined distance comprising a rock shaft rotatably carried by said boom and rockable about an axis substantially parallel to the axis of swinging movement of said bucket, a reset arm fixed adjacent one end of said rock shaft, a rock arm fixed adjacent the other end of said rock shaft, a cam follower pivotally secured to said rock arm and freely swingable with respect thereto when rocked in one direction and caused to swing into engaging relationship with said rock shaft when rocked in the other direction for rocking said rock shaft in said other direction, a roller fixed with said tractor and in the path of movement of said cam follower upon said boom's being swung upwardly and downwardly relatively to said roller, said cam follower engaging said rock arm for rocking said rock shaft in said other direction in response to said roller's urging said cam follower in said other direction, and a reset rod between said reset arm and said bucket for swinging said bucket into its load receiving position in response to said cam follower's being rocked in said other direction a predetermined amount.

3. In a tractor mounted loader having a swingable boom and a bucket swingably carried adjacent the swinging end of said boom, said bucket being biased to move from a load receiving position to a load dumping position, means for latching said bucket in its load receiving position, and means operable by the operator from his position on the tractor for unlatching said bucket for permitting said bucket to swing into its load dumping position, the improvement comprising a force transmitting means for moving the bucket from its load dumping position to its load receiving position upon said boom's being permitted to swing downwardly a predetermined distance comprising a rock shaft rotatably carried by said boom and rockable about an axis substantially parallel to the axis of swinging movement of said bucket, a reset arm fixed adjacent one end of said rock shaft, a rock arm fixed adjacent the other end of said rock shaft, a cam follower pivotally secured to said rock arm at a point spaced from said rock shaft, said cam follower being formed of a length sufficient to extend longitudinally beyond the end of said rock arm, the other end of said cam follower having formed thereon an abutment portion caused to be moved into abutting relationship with respect to said rock shaft upon said cam follower's being rocked in one direction for rocking said rock shaft in one direction, said cam follower being freely swingable in the other direction, resilient means for biasing said cam follower to swing in said one direction, a roller fixed with said tractor and in the path of movement of said cam follower upon said boom's being permitted to swing downwardly a predetermined amount, the abutment of said cam follower engaging said rock shaft for rocking said rock shaft in said one direction in response to said roller's urging said cam follower in said one direction, and a yielding lost motion link between said reset arm and said bucket for swinging said bucket into its load receiving position in response to said boom's being permitted to swing downwardly a predetermined distance.

4. In a tractor mounted loader having a swingable boom and a bucket swingably carried adjacent the swinging end of said boom, said bucket being biased to move from a load receiving position to a load dumping position, means for latching said bucket in its load receiving position, and means operable by the operator from his position on the tractor for unlatching said bucket for permitting said bucket to swing into its load dumping position, the improvement comprising a force transmitting means for moving the bucket from its load dumping position to its load receiving position upon said boom's being permitted to swing downwardly a predetermined distance comprising a rock shaft rotatably carried by said boom and rockable about an axis substantially parallel to the axis of swinging movement of said bucket, a reset arm fixed adjacent one end of said rock shaft, a rock arm fixed adjacent the other end of said rock shaft, a cam follower pivotally secured to said rock arm at a point spaced from said rock shaft, said cam follower being formed of a length sufficient to extend longitudinally beyond the end of said rock arm, the other end of said cam follower having formed thereon an abutment portion caused to be moved into abutting relationship with respect to said rock shaft upon said cam follower's being rocked in one direction for rocking said rock shaft in one direction, said cam follower being freely swingable in the other direction, resilient means for biasing said cam follower to swing in said one direction, a roller fixed with said tractor and in the path of movement of said cam follower upon said boom' being permitted to swing downwardly a predetermined amount, the abutment of said cam follower engaging said rock shaft for rocking said rock shaft in said one direction in response to said roller's urging said cam follower in said one direction, a sleeve pivotally carried by said reset arm adjacent the swingable end thereof, a reset rod pivotally secured to said bucket and slidably received in said sleeve, a stop provided on said rod adjacent the rearward end thereof, a spring received by said rod and positioned between said stop and said sleeve, a second stop provided on said rod forwardly of said sleeve, and a second spring received by said rod between said sleeve and said second stop, the first mentioned spring and the first mentioned stop effecting a yielding lost motion connection between said reset arm and said rod, and the second spring and said first mentioned spring preventing substantial axial movement of said sleeve and said rod when said cam follower is not in abutting relationship with respect to said roller.

5. In a tractor mounted loader having a boom, clamps for swingably connecting the boom to the opposite sides of said tractor, a bucket carried adjacent the swingable end of said boom forwardly of said tractor and biased to move from a load receiving position to a load dumping position, upwardly extending standards swingably carried by said boom adjacent the pivotal connections thereof with said tractor, said standards being connected with said tractor for preventing fore-and-aft swinging thereof, telescopic links on opposite sides of said tractor and interconnected between said upwardly extending standards and said bucket, each of said telescopic links including a receiving member and a slidable member, said links being extensible sufficiently to permit said bucket to swing from a load receiving position to a load dumping position, aligned latch pins carried by one of said members of said links, a cross shaft rotatably carried by the other of said members of said links, pin receiving arms fixed to said rock shaft adjacent the opposite ends thereof and positioned to engage said pins upon said bucket's being swung into a load receiving position, resilient means for biasing said pin receiving arms to move into latching position with respect to said latch pins, and means operable from the operator's station on the tractor for rocking said cross shaft in an unlatching direction for permitting extension of said links sufficiently to allow said bucket to move from a load receiving position to a load dumping position.

6. A loader in combination with a tractor, said loader comprising a pair of spaced-apart forwardly extending arms positioned on opposite sides of said tractor, a bucket swingably connected to said arms adjacent the forward ends thereof and forwardly of said tractor, a pair of links positioned on opposite sides of said tractor and vertically spaced with respect to said arms, said links being pivotally connected to the opposite sides of said bucket adjacent the forward ends thereof, a link pivotally interconnected between the rearward ends of each of the first mentioned links and each of said arms, means for swingably connecting each of said arms with said tractor for up-and-down swinging movement, and a link interconnected between each of the second mentioned links and the tractor for holding said second mentioned links in predetermined angled positions with respect to said tractor independently of the angled positions of said arms with respect thereto, the distance between the connection of each of said first mentioned links with said bucket and the pivotal connection of each of said arms with said bucket being greater than the distance between the pivotal connection of each of the second mentioned links with each of the first mentioned links and each of the second mentioned links with said arms, whereby said bucket when in a loading position will be caused to assume substantially the angle of said arms, but when moved into a raised or unloading position, will be caused to assume a lesser angle with respect to the horizontal than the arms so as to prevent the bucket from becoming overbalanced.

References Cited in the file of this patent

UNITED STATES PATENTS

| | | |
|---|---|---|
| 2,402,064 | Markel | June 11, 1946 |
| 2,481,251 | Severin et al. | Sept. 6, 1949 |
| 2,494,684 | Best | Jan. 17, 1950 |
| 2,614,712 | Dingley | Oct. 21, 1952 |
| 2,632,575 | Geraldson et al. | Mar. 24, 1953 |
| 2,660,322 | Richey | Nov. 24, 1953 |